Jan. 19, 1971 W. MERTENS 3,556,925
METHOD OF PRODUCING AN INSULATING SLEEVE OF MICA TAPE
IMPREGNATED WITH THERMOSETTING EPOXIDE IMPREGNATING
RESIN MIXTURE AND PRODUCT THEREOF
Filed Dec. 3, 1968
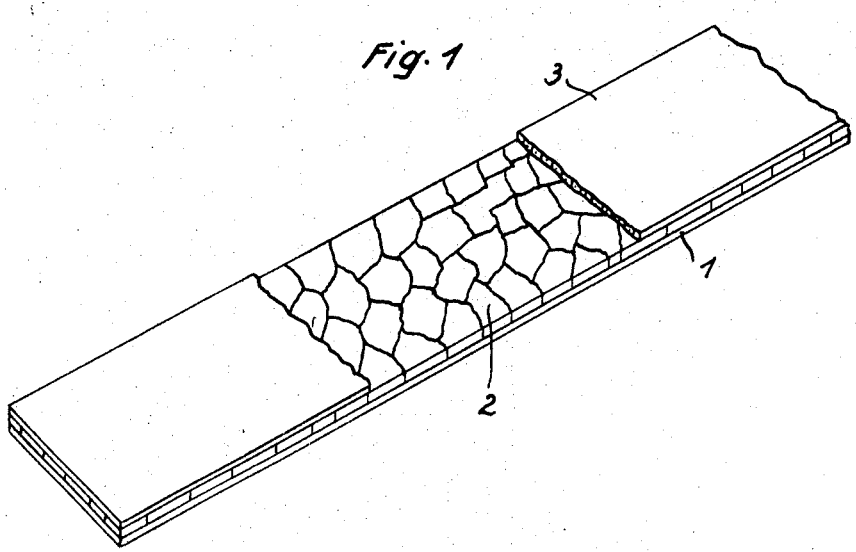
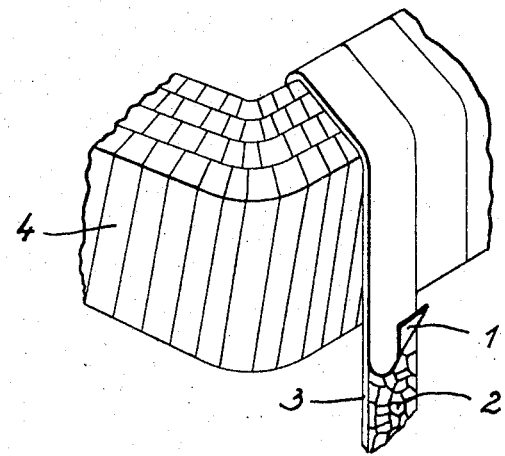
Inventor:
Willi Mertens United States Patent Office 3,556,925
Patented Jan. 19, 1971

3,556,925
METHOD OF PRODUCING AN INSULATING SLEEVE OF MICA TAPE IMPREGNATED WITH THERMOSETTING EPOXIDE IMPREGNATING RESIN MIXTURE AND PRODUCT THEREOF
Willi Mertens, Berlin-Zehlendorf, Germany, assignor to Siemens Aktiengesellschaft, a corporation of Germany
Continuation-in-part of abandoned application Ser. No. 204,445, June 22, 1962. This application Dec. 3, 1968, Ser. No. 796,938
Claims priority, application Germany, June 23, 1961, S 74,586
Int. Cl. B32b 19/02, 19/06
U.S. Cl. 161—163                                      23 Claims

ABSTRACT OF THE DISCLOSURE

Flexible mica tape for producing an electrically insulating sleeve (jacket) impregnated with a thermosetting mixture of epoxide and hardner components includes two superimposed sheets of pliable base material with a layer of mica flakes disposed therebetween, a liquid binder applied to the mica flakes to bind them together and to the pliable sheet base material, the binder consisting of a substance selected from compounds containing epoxide groups or glycidyl groups and having a molecular weight between 300 and 2000 and of an accelerator selected from the group consisting of di- and polytertiary aliphatic-aromatic amines in which the amine-nitrogen is directly bound to an aromatic system, from organozinc salts soluble in organic solvents or from ethylamineboron fluoride, piperidineboron fluoride and dimethylanilineboron fluoride applied to the mica tapes of accelerating addition polymerization of thermosetting epoxide impregnating resin mixtures on the basis of bi- and higher-functional glycidyl ethers or epoxides with acid anhydrides as hardener.

---

This application is a continuation-in-part of my application Ser. No. 204,445 filed June 22, 1962, now abandoned and relates to method of producing an insulating jacket of mica tape impregnated with thermosetting epoxide impregnating resin mixture and the insulating jacket produced thereby. Such insulating jackets are used for and on electric conductors such as conductors rods or coils that form the windings in electric machines.

It is known from U.S. Pat. No. 2,656,290 of Oct. 20, 1953, to produce insulating sleeves or wrappings on the winding rods or coils of electric machines from mica tape in which the individual mica flakes are bonded to one another as well as to a pliable base sheet and, if desired, also to a cover sheet, by a liquid bonding agent which is not self-hardening but can be hardened by suitable additions. The term "liquid," herein applied to the bonding agent, denotes a material having a viscosity between 25 and 10,000 poises at 25° C. The bonded mica tape used for these purposes may be relatively narrow, having a width of 2 to 3 cm. for example, or it may be used in sheets of greater width. After wrapping the mica tape about the conductor to be insulated, the insulator with the tape-wound insulation is subjected to vacuum and impregnated with a thinly liquid impregnating resin. The resin and the bonding agent are so chosen relative to each other that the bonding agent, together with the hardeners and polymerization accelerators present in the impregnating resin, combines completely with the impregnating resin, so that the hardened synthetic resin of the finished insulating sleeve constitutes a chemically uniform body.

According to known methods of this type, unsaturated polyesters are used as the impregnating resin, these esters being obtained, for example, by reacting $\alpha,\beta$-unsaturated dicarboxylic acids with glycols. Reactive monomers, such as styrene or triallylcyanurate for example, are then added to these unsaturated polyesters, whereas unsaturated polyesters without an addition of reactive monomers are employed as the bonding agent for cementing the constituents of the composite mica tape together. Since the bonding agent, when wrapping the conductor to be insulated, is soft and not yet hardened, the very pliable mica tape can be tightly wrapped around sharp edges.

It is essential, particularly for insulating sleeves that are to be resistant to high voltage, that the impregnating resin during the impregnating step have a viscosity which does not appreciably exceed 30 cp. so that the insulating enclosure is completely penetrated by the impregnating resin. Such a low viscosity can be secured with the polyester resins heretofore used by diluting them with styrene or another reactive monomer. With these polyester impregnating resin mixtures, it is then possible, by the properly adapted dosage of decelerators and accelerators, to secure a prolonged shelf life without increase in viscosity. Therefore, after impregnating the wrapped conductors, the excessive amount of polyester impregnating resin mixture is then pumped back into the storage container and can thereafter be used for further impregnations. Since the viscosity of the polyester impregnating resin at normal room temperature does not increase, the pumping and storing can be repeated very often so that the impregnating mixture can be employed for a large number of impregnation cycles.

However, the large proportion of the low-molecular reactive substances in the polyester resin impregnation mixture has the disadvantages of relatively severe shrinking. This requires particular expedients to compensate for the shrinking occurring during the hardening process. The danger of this disadvantageous shrinking can be decreased considerably by resorting to impregnating resin systems with lower shrinkage characteristics, such as are constituted, for example, by thermal hardening epoxide impregnating resin mixtures on the basis of bi- or higher-functional glycidyl ethers or epoxide compounds and acid anhydrides. These thermal hardening epoxide resin mixtures, however, have the disadvantage that their viscosity continuously increases while they are in storage. Since furthermore their initial viscosity is higher than that of the diluted polyester impregnating resin mixtures, the epoxide resin mixtures require higher impregnating temperatures in order to have the viscosity below 30 cp. during the impregnating process. Due to this higher temperature, the addition polymerization reaction of the epoxide resin mixtures, which is the cause of the rapid viscosity increase during storage, is accelerated to a still greater extent. Although it is possible, by the choice of suitable epoxide resin mixtures, to keep this spontaneous reaction within bearable limits so that these resin mixtures remain applicable for more than 100 hours even at an impregnating temperature of 60° to 70° C., these resin mixtures require an unbearably long time to completely harden.

It is an object of my invention to overcome the above-mentioned difficulties encountered when attempting to use epoxide resins for impregnating an insulation jacket consisting of mica tapes wounded on the electric conductors of electric machines, said mica tapes composed of mica flakes bonded to one another and to a flexible supporting sheet by a binder, and when the epoxide resins contained in the insulation jacket after the impregnation will be afterwards hardened.

To this end, and in accordance with a feature of my invention, I add to the mica tape bonded by a liquid binder having a viscosity between 25 and 10,000 poises at 25° C. and consisting of a substance selected from compounds containing epoxide groups or glycidyl groups and having a molecular weight between 300 and 2000 an accelerator which excites the addition polymerization reaction of the thermal hardening (setting) epoxide impregnating resin mixture and which virtually does not affect the ionic polymerization of epoxide compounds at room temperature. Such an accelerator is preferably added to the mica tape in a quantity of about 0.1 to 0.4% of the total weight of the mica tape, while the binder is 3 to 7% by weight of the mica tape.

According to another feature of my invention, the accelerator added to the mica tape is preferably admixed to the bonding agent employed for bonding the components of the mica tape together. This is the simplest way of introducing the accelerator into the mica tape. The liquid binder used in the mica tape consisting of compounds containing epoxide groups or glycidyl groups and having a molecular weight between 300 and 2000 is at least at room temperature a non self-hardening bonding agent. In order to have this liquid binder well built into the epoxide impregnating resin mixture when hardening the epoxide resins contained in the insulation jacket after the impregnation a hardener-free epoxide compound is advantageously employed as bonding agent, which results in particularly favorable electric properties of the finished insulating jacket.

However for the purposes of the invention not any accelerator speeding the addition polymerization reaction between epoxide compounds and acid anhydrides is suitable. Any of the compounds heretofore employed in resin techniques as hardening accelerators acts simultaneously as hardeners for epoxide compounds by causing the ionic polymerization by room temperature. Such ionic polymerization accelerators are unsuitable for the purposes of the invention and consist of certain amines for example benzyldimethylamine, tri-isooctylamine or triethanolamine. Another disadvantage of these amines is that, due to their high alkalinity, they absorb carbon dioxide (carbonic acid anhydride) from the air and thereby convert to carbonates. Mica tapes produced with such compounds would become useless after a few days because the epoxide compounds employed as adhesive resin harden and become insoluble by ionic polymerization. Furthermore, the absorbed carbon dioxide may cause bubble formation during the subsequent hardening of the impregnating resin mixture.

The invention overcomes these difficulties by the use only of accelerators which, while accelerating the addition polymerization reaction of the epoxide impregnated resin mixture, do not or only slightly stimulate the ionic polymerization of the hardener-free epoxide compound at room temperature. I have found that it is particularly advantageous for the invention to employ mixed aliphatic-aromatic amines in which the amine nitrogen is directly bound to an aromatic system. Exmaples of suitable compounds are the di- or polytertiary aliphatic-aromatic amines, for example 4,4'-dimethylaminodiphenylmethane, 4,4' - dimethylaminotriphenylmethane, 4,4',4''-dimethylaminotriphenylcarbinol and 4,4' - dimethylamino - benzophenone.

Also suitable for the purposes of the invention are zinc salts which are soluble in organic solvents, for example zinc oleate, zinc octoate or zinc naphthenate.

Additional suitable accelerators are complex boron compounds in which the electron-octet gap of the boron atom is closed by a free electron pair of the nitrogen atom in a suitable amine compound. These compounds dissociate only at higher temperatures whereby the amine can become active as a hardening accelerator. Compounds exhibiting these properties are, for example, triethanolamineborate and the complex compounds from boron trifluoride and ethylamine or piperidine such as boron fluoride-ethylamine, boron fluoride-piperidine and boron fluoride-dimethylaniline.

The invention will be further described with reference to the accompanying drawing in which:

FIG. 1 is a schematic and perspective view of a mica tape according to the invention on enlarged scale, and FIG. 2 is a perspective and fragmentary view of an electric-machine winding being wrapped with mica tape according to FIG. 1.

The mica tape comprises a flexible base layer of pliable sheet material. Used for this purpose, for example, may be rice paper or other cellulosic tissue having a thickness of a few microns. Also applicable as the base layer is a web of other materials such as asbestos, nylon film or other synthetic foil. Placed upon this base layer 1 is a layer 2 of mica flakes. The layer is covered by another layer consisting preferably of the same material as the base layer 1. If desired, however, the base layer 1 and the cover layer 3 may consist of different pliable materials. The mica flakes in layer 2 are bonded together and to the base and cover layers 1, 3 by a bonding agent consisting of the hardener-free epoxide compound, bisglycidyl ether of diphenylolpropane. A further suitable hardener-free epoxide compound for use as bonding agent is an adduct from 1 mole of a phenolic compound, for example, a phenol, cresol or xylenol, and 1 mole of the bis-glycidyl ether of diphenylolpropane. Also suitable as hardener-free epoxide compound is an adduct from 1 mole of the compound available under the tradename "Epoxide 201" (3,4-epoxy - 6-methyl - cyclohexyl-methyl - 3,4 - epoxy-6 - methyl - cyclohexanecarboxylate) and 0.2 to 0.5 mole of a dicarboxylic acid, for example cis-hexahydrophthalic acid. Other suitable bonding agents are bisglycidyl ether formed from the condensation of bisphenol A with epichlorhydrin and adducts of unimolar phenolic compounds such as phenol, cresol or xylenol, for example, to the aforementioned epoxide compounds wherein the phenolic compound used in the reaction is of such quantity that only one of the two epoxide groups in the molecule is changed. Moreover, cycloaliphatic epoxide resins, for example, such as the epoxide 201 of Union Carbide, CY175 of CIBA, adducts of these resins containing free epoxide groups by reaction with mono or dicarboxylic acids or phenols as well as mixtures of these resins with one another as well as with the bisglycidyl ether and adducts of unimolar phenolic compounds are also suitable as bonding agents. The proportion by weight of the bonding agent is between 3 and 7% of the mica tape. In general, compounds containing epoxide groups or glycidyl groups and being within the range of molecular weights 300 to 2000 are suitable as bonding agents. These compounds are not self-hardening, however, since they do not contain any hardeners. This is of great importance for providing the mica tape with a longer shelf life.

In accordance with the invention, the bonding agent serving for bonding the components of the mica tape together, is given an addition of an accelerator which does not stimulate the ionic polymerization of the hardener-free epoxide compounds serving as adhesive, in a quantity of about 0.1 to 0.4% of the total weight of the mica tape, that means, because the proportion by weight of the bonding agent is between 3 and 7% of the mica tape, the addition of accelerator is in a quantity of about 3 to 10% by weight of the bonding agent.

For example, in accordance with the invention the bonding agent serving for bonding the components of the mica tape together, is given a 5% addition of an accelerator consisting of 4,4'-dimethylamino - diphenylmethane which, as stated above, is a mixed aliphatic-aromatic amine whose amine-nitrogen is bound directly to an aromatic system. Since this accelerator does not stimulate the ionic polymerization of the hardener-free epoxide compounds serving as adhesive, the mica tape can be stored for several months without increase in viscosity of the epoxide compound used as adhesive. Consequently, this mica tape has a virtually unlimited shelf life with respect to the storage periods that occur in the industrial practice of producing the winding insulation for electrical machines.

A mixture of the bonding resin and accelerator is applied in dissolved state to the mica tape and the solvent is thereafter vaporized. Other examples of such suitable mixtures are the following.

EXAMPLE I

Epoxide resin mixtures consisting of 65 parts of a glycidyl ether of diphenylpropane with an expoxide-equivalent weight of about 200, and 35 parts of an epoxide resin having a basis of glycidyl ether of diphenylolpropane with an epoxide-equivalent weight of about 500.

To 100 parts of this mixture, 5% 4,4'-dimethylaminodiphenylmethane is admixed. This mixture is dissolved in toluol and is used as bonding resin for producing a mica tape according to the invention.

EXAMPLE II 100 parts of the cycloaliphatic resin known by the trade name CY175 of CIBA are mixed with 5% 4,4'-dimethylamino-diphenylmethane, and then dissolved in toluene.

EXAMPLE III

A mixture of 50 parts of the cycloaliphatic resin known by the trade name CY175 of CIBA, 50 parts of a resin of the type known by the trade name Epon 1004 of the Shell Oil Company and 5 parts 4,4'-dimethylaminobenzophenone dissolved in a mixture of solvents consisting of two parts toluol and one part methylisobutylketone are used as bonding resin for the production of mica tape in accordance with the invention.

EXAMPLE IV 100 parts of bisphenol epoxide resin with an epoxide equivalent of about 300 such as for example the resin known by the trade name Epon 834 of the Shell Oil Company and 5 parts boronfluoridepiperidine adduct are dissolved in methylisobutylketone.

EXAMPLE V

A mixture of 50 parts each of the resins known by the trade names Epon 1001 and Epon 828, both of the Shell Oil Company, are admixed with 5 parts zinc naphthenate. This mixture of resins is dissolved in a solvent mixture consisting of 70 parts toluol and 30 parts acetone, and the resulting solution can then be employed for producing mica tape according to the invention.

The manufacture of the mica tape illustrated in FIG. 1 can be effected in the following way, for example. The flexible base layer 1 consisting of Japan (rice) paper of a few micron thickness is sprayed slightly, by suitable means such as a spray nozzle or spray gun, with a bonding agent consisting of the epoxide compound bisglycidyl ether of diphenylolpropane dissolved in toluene, a suitable solvent. The epoxide compound, which is free of any hardener, contains 5% of 4,4'-dimethylaminodiphenylmethane added thereto. Thereafter a layer of mica flakes is deposited on the base 1. The layer is again sprayed slightly with the abovementioned bonding agent. Then another layer of mica flakes is deposited which again is sprayed slightly with bonding agent. After thus depositing several mica layers, the cover layer 3 is placed on top of the final mica layer, this cover layer consisting of the same material as the base layer. The total bonding agent present in the final product was about 4% of the mica tape. The mica sheet thus produced may have any desired width. In the further course of the manufacture, the conductor to be insulated may be wrapped with a wide mica sheet corresponding, for example, to the length of the straight portion of a winding rod. If, however, the wrapping is to be done with relatively small tapes, then the wide web or tape produced in the above-described manner is cut into strips of suitable smaller width.

The epoxide compound used for bonding the components of the mica tape together, including the added accelerator, is fully built chemically into the thermal hardening epoxide impregnating resin mixture used for impregnation of the envelope wrapped onto the conductor. For facilitating the impregnating operation it is preferable to use the minimum quantity of the binding agent, necessary for causing the mica to adhere to the supporting layer.

For producing the insulating sleeve or envelope of the winding rod for an electrical machine, the mica tape made in the above-described manner and shown in FIG. 1, is wound about the winding or rod of the electrical machine as illustrated in FIG. 2. After the winding rod 4 is wrapped with the mica tape, the rod, after being dried preferably under vacuum, is impregnated with a thermal hardening epoxide impregnating resin mixture consisting of bi- or higher-functional glycidyl ethers or epoxide compounds and acid anhydrides.

The impregnating resin-hardener mixtures of my invention are thermosetting epoxide impregnating mixtures on the basis of bi- or higher-functional glycidyl ethers or epoxide compounds and acid anhydrides. Compounds of the type consisting of bisglycidyl ether or diphenylolpropane having the trade name Epon 828 of the Shell Oil Company and the trade name D.E.R. 332 of Dow Chemical Company are applicable as the bi- or higher-functional glycidyl ethers. These resins are to be considered to be tetra-functional in the chemical reaction thereof with dicarboxylic acid anhydride. The bisglycidyl ether of resorcinole is also suitable as the resin.

In order to attain the desired lower viscosity values for impregnation, bi-functional epoxide compounds, such as phenyl or cresylglycidyl ether can be admixed. Compounds that are formed from the epoxidyzing of C=C compounds are suitable furthermore as dilutants. Compounds of this type are vinylcyclohexenoxide or vinylcyclohexendioxide, for example. Lower molecular cycloaliphatic resins, such as the resin known by the trade name Epoxide 201 of Union Carbide Company, can also be used.

Hexahydrophthalic acid anhydride, methylhexahydrophthalic acid anhydride, methyltetrahydrophthalic acid anhydride, methylendomethylene tetrahydrophthalic acid anhydride, for example, are suitable as acid anhydride hardeners.

The impregnating temperature is approximately 60° to 70° C., to make certain that the epoxide impregnating resin mixture, during impregnation, has a viscosity of less than 30 cp. and therefore assuring the complete impregnation of the insulation wound upon the conductor 4. Thereafter, the excess impregnating resin mixture is pumped back to a storage vessel for repeated use, since its period of usefulness is a great multiple of the impregnating cycle.

A mixture of 100 parts epoxide resin of the type known by the trade name D.E.R. 332 of the Dow Chemical Company with 100 parts hexahydrophthalic acid anhydride, a mixture of 100 parts D.E.R. 332 with 120 parts methylhexahydrophthalic acid anhydride, or a mixture of 100 parts D.E.R. 332 with 130 parts methylendomethylene tetrahydrophthalic acid anhydride is considered as suitable thermal hardening epoxide impregnating resin.

The viscosity of the foregoing impregnating resin mixtures is between 18 and 30 cp. at a temperature of 70° C. In order to attain lower impregnating viscosities at 70° C. or to be able to impregnate at lower impregnating temperatures such as at 60° C. for example, instead of employing 100 parts D.E.R. 332, in the aforementioned mixtures, a mixture of 80 parts D.E.R. 332 with 20 parts phenylglycidyl ether or a mixture of 80 parts D.E.R. 332 and 20 parts vinylcyclohexendioxide can be used.

A high-voltage resistant insulation which was produced of the mica tape made in the above-described manner and shown in FIG. 1, after a storage time of about one year, showed a breakdown-voltage of more than 20 kv./mm. and an increase of dielectric losses lower than one ‰ per kv. These results do not differ appreciably from those of a high-voltage resistant insulation produced of a mica tape made in the above-described manner and shown in FIG. 1, after a storage time of only a few days.

The portion of the thinly liquid epoxide impregnating resin mixtures which penetrates the insulating envelope wrapped upon the conductor 4 dissolves the accelerator added to the mica tape in accordance with the invention. The proportion of the accelerator in the impregnating resin mixture contained in the wrapped insulating envelope amounts to about 0.2 to 1% based on the impregnating resin mixture and may be for example 0.5, 0.6 or 0.8% of the resin mixture employed for impregnating the wrapped conductor. This accelerator effects the rapid initiation of the addition polymerization reaction between the epoxide compounds contained in the wrapped insulating envelope and the acid anhydride hardener, so that the insulation hardens to a rigid jacket or sleeve within a relatively short time. The hardening time is further shortened by increasing the fabricating temperature to above 100° C.

I claim:

1. Flexible mica tape for producing a tape-wound insulating jacket to be impregnated with thermosetting epoxide impregnating resin mixtures on the basis of bi- and higher-functional glycidyl ethers or epoxide compounds and acid anhydrides as hardener and to be afterwards hardened, said flexible mica tape comprising two superimposed sheets of pliable base material, at least one layer of mica flakes disposed between the two sheets of base material, a liquid binder having a viscosity between 25 and 10,000 poises at 25° C. applied to the mica flakes to bind them together and to said pliable sheet base material, said binder consisting of a substance selected from compounds containing hardener-free epoxide groups or glycidyl groups and having a molecular weight between 300 and 2000, and of an accelerator selected from the group consisting of di- and polytertiary aliphatic-aromatic amines in which the amine-nitrogen is directly bound to an aromatic system, said accelerator being applied to the mica flakes for accelerating addition polymerization of said thermosetting epoxide impregnating resin mixtures.

2. Flexible mica tape according to claim 1 wherein said accelerator is selected from the group consisting of 4,4'-dimethylamino-diphenylmethane, 4,4'-dimethylaminotriphenylmethane, 4,4',4''-dimethylaminotriphenylcarbinol and 4,4'-dimethylaminobenzophenone.

3. Flexible mica tape according to claim 1 wherein said accelerator is 0.1 to 0.4% by weight of the mica tape.

4. Flexible mica tape according to claim 1 wherein said binder is 3 to 7% by weight of the mica tape.

5. Flexible mica tape for producing a tape-wound insulating jacket to be impregnated with thermosetting epoxide impregnating resin mixtures on the basis of bi- and higher-functional glycidyl ethers or epoxide compounds and acid anhydrides as hardener and to be afterwards hardened, said flexible mica tape comprising two superimposed sheets of pliable base material, at least one layer of mica flakes disposed between the two sheets of base material, a liquid binder having a viscosity between 25 and 10,000 poises at 25° C. applied to the mica flakes to bind them together and to said pliable sheet base material, said binder consisting of a substance selected from compounds containing hardener-free epoxide groups or glycidyl groups and having a molecular weight between 300 and 2000, and of an accelerator selected from the group consisting of organozinc salts soluble in organic solvents applied to the mica flakes for accelerating addition polymerization of said thermosetting epoxide impregnating resin mixtures.

6. Flexible mica tape according to claim 5 wherein said accelerator is selected from the group consisting of zinc naphthanate, zinc octoate and zinc oleate.

7. Flexible mica according to claim 5 wherein said accelerator is 0.1 to 0.4% by weight of the mica tape.

8. Flexible mica tape according to claim 5 wherein said binder is 3 to 7% by weight of the mica tape.

9. Flexible mica tape for producing a tape-wound insulating jacket to be impregnated with thermosetting epoxide impregnating resin mixtures on the basis of bi- and higher functional glycidyl ethers or epoxide compounds and acid anhydrides as hardener and to be afterwards hardened, said flexible mica tape comprising two superimposed sheets of pliable base material, at least one layer of mica flakes disposed between the two sheets of base material, a liquid binder having a viscosity between 25 and 10,000 poises at 25° C. applied to the mica flakes to bind them together and to said pliable sheet base material, said binder consisting of a substance selected from compounds containing hardener-free epoxide groups or glycidyl groups and having a molecular weight between 300 and 2000, and of an accelerator selected from the group consisting of ethylamineboron fluoride, piperidineboron fluoride and dimethylanilineboron fluoride, said accelerator being applied to the mica flakes for accelerating addition polymerization of said thermosetting epoxide impregnating resin mixtures.

10. Flexible mica tape according to claim 9 wherein said accelerator is 0.1 to 0.4% by weight of the mica tape.

11. Flexible mica tape according to claim 9 wherein said binder is 3 to 7% by weight of the mica tape.

12. Flexible mica tape insulation for electrical conductors, which comprises at least one sheet of pliable base material with at least one layer of mica flakes superimposed on said sheet of pliable base material and 3 to 7% by weight of the mica tape, of a liquid binder applied to the mica flakes to bind them together and to said sheet of pliable base material, the liquid binder being comprised of bisglycidyl ether of diphenylolpropane having a viscosity of between 25 and 10,000 poises at 25° C. and containing 0.1 to 0.4% by weight of the mica tape, of 4,4'-dimethylaminodiphenylmethane.

13. Method of producing an electrically insulating jacket on a conductor with a flexible mica tape which comprises winding the conductor with said flexible mica tape comprising sheet backing, a layer of mica flakes applied to the backing, and a liquid binder having a viscosity between 25 and 10,000 poises at 25° C. consisting of a substance from compounds containing hardener-free epoxide groups or glycidyl groups and having a molecular weight between 300 and 2000, and of an accelerator selected from the group consisting of di- and polytertiary aliphatic-aromatic amines in which the aminenitrogen is directly bound to an aromatic system and impregnating the wrapped jacket with thermosetting epoxide impregnating resin mixtures on the basis of bi- and higher-functional glycidyl ethers or epoxide compounds and acid anhydrides as hardener and hardening.

14. Method of producing an electrically insulating jacket according to claim 13 wherein said accelerator is 0.1 to 0.4% by weight of the mica tape.

15. Method of producing an electrically insulating jacket according to claim 13 wherein said binder is 3 to 7% by weight of the mica tape.

16. Method of producing an electrically insulating jacket on a conductor with a flexible mica tape which comprises winding the conductor with said flexible mica tape comprising sheet backing, a layer of mica flakes applied to the backing, and a liquid binder having a viscosity between 25 and 10,000 poises at 25° C. consisting of a substance from compounds containing hardener-free epoxide groups or glycidyl groups and having a molecular weight between 300 and 2000, and of an accelerator selected from the group consisting of organozinc salts soluble in organic solvents and impregnating the wrapped jacket with thermosetting epoxide impregnating resin mixtures on the basis of bi- and higher-functional glycidyl ethers or epoxide compounds and acid anhydrides as hardener and hardening.

17. Method of producing an electrically insulating jacket according to claim 16 wherein said accelerator is 0.1 to 0.4% by weight of the mica tape.

18. Method of producing an electrically insulating jacket according to claim 16 wherein said binder is 3 to 7% by weight of the mica tape.

19. Method of producing an electrically insulating jacket on a conductor with a flexible mica tape which comprises winding the conductor with said flexible mica tape comprising sheet backing, a layer of mica flakes applied to the backing, and a liquid binder having a viscosity between 25 and 10,000 poises at 25° C. consisting of a substance from compounds containing hardener-free epoxide groups or glycidyl groups and having a molecular weight between 300 and 2000, and of an accelerator selected from the group consisting of ethylaminoboron fluoride, piperidineboron fluoride and dimethylanilineboron fluoride, and impregnating the wrapped jacket with thermosetting epoxide impregnating resin mixtures on the basis of bi- and higher-functional glycidyl ethers or epoxide compounds and acid anhydrides as hardener and hardening.

20. Method of producing an electrically insulating jacket according to claim 19 wherein said accelerator is 0.1 to 0.4% by weight of the mica tape.

21. Method of producing an electrically insulating jacket according to claim 19 wherein said binder is 3 to 7% by weight of the mica tape.

22. Method of producing an electrically insulating jacket according to claim 13 wherein said accelerator is selected from the group consisting of 4,4'-dimethylaminodiphenylmethane, 4,4' - dimethylaminotriphenylmethane, 4,4',4''-dimethylaminotriphenylcarbinol and 4,4'-dimethylaminobenzophenone.

23. Method of producing an electrically insulating jacket according to claim 16 wherein said accelerator is selected from the group consisting of zinc naphthanate, zinc octoate and zinc oleate.

References Cited

UNITED STATES PATENTS

| | | | |
|---|---|---|---|
| 2,917,570 | 12/1959 | Wolff et al. | 161—163 |
| 3,072,737 | 1/1963 | Chen | 174—110 |
| 3,458,389 | 7/1969 | Mertens | 161—170 |

OTHER REFERENCES

Skeist, "Epoxy Resins" (1958), Reinhold Pub. Corp., New York, N.Y., pp. 30–32, 45, 46, 162, 163 and 173.

WILLIAM J. VAN BALEN, Primary Examiner

U.S. Cl. X.R.

156—53, 330; 161—171, 184, 188; 174—120